United States Patent [19]
Johns et al.

[11] 4,217,973
[45] Aug. 19, 1980

[54] WEAR INDICATING DEVICE FOR A FRICTION BRAKE

[75] Inventors: Christopher Johns, Rubery, England; Gérard Le Deit, Aulnay Sous Bois, France

[73] Assignee: Societe Anonyme D.B.A., Paris, France

[21] Appl. No.: 968,606

[22] Filed: Dec. 11, 1978

[51] Int. Cl.$^2$ .............................................. F16D 66/02
[52] U.S. Cl. .................................. 188/1 A; 188/79.5 P
[58] Field of Search ............... 188/1 A, 79.5 P, 196 C, 188/196 P

[56] References Cited

U.S. PATENT DOCUMENTS

| | | | |
|---|---|---|---|
| 2,559,830 | 7/1951 | Pistoles et al. | 188/196 C |
| 3,339,678 | 9/1967 | Burnett | 188/79.5 P |
| 3,943,486 | 3/1976 | Hayashida et al. | 188/1 A |

FOREIGN PATENT DOCUMENTS

| | | | |
|---|---|---|---|
| 2404975 | 8/1914 | Fed. Rep. of Germany | 188/79.5 P |
| 2224330 | 10/1974 | France | 188/1 A |
| 1416073 | 12/1975 | United Kingdom | 188/1 A |

*Primary Examiner*—Edward R. Kazenske
*Attorney, Agent, or Firm*—Paul David Schoenle; Ken C. Decker

[57] ABSTRACT

A friction brake is equipped with an automatic adjuster (40, 44) and with a device (84, 86) indicating wear of the friction lining pads. The indicating device is associated with a movable member of the automatic adjuster and is also controlled by the automatic adjuster. The indicating device comprises a flexible blade (84) adapted to engage a rough cylindrical surface (86) formed on the hub (88) of the wheel associated with the brake.

5 Claims, 4 Drawing Figures

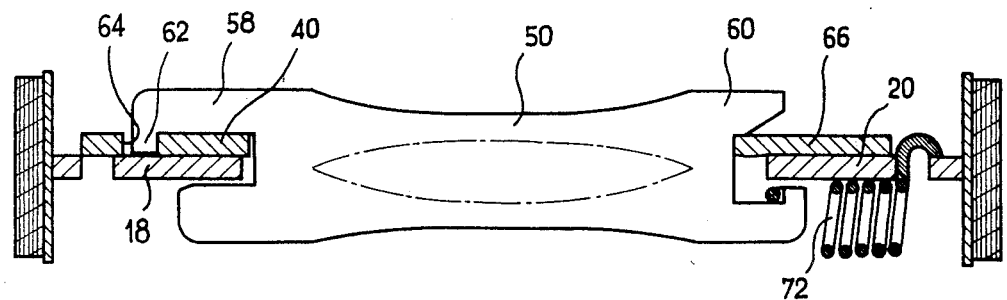

WEAR INDICATING DEVICE FOR A FRICTION BRAKE

The invention relates to a brake for vehicles, more particularly a brake equipped with adjusting means for automatically compensating for wear on the friction linings and with a detecting device capable of warning the vehicle's driver of the worn condition of the linings.

A large number of known disc and drum brakes are equipped with detecting devices. The detecting devices generally used are operated either by the closure of the opening of an electrical circuit controlling a warning light or audible warning means, or by the engagement of a vibrating blade with a rough surface on the rotary member being braked, which generates a sound signal audible to the driver of the vehicle. In either case the detecting device has a moving part, usually associated with one of the friction members bearing the friction linings. This moving part may be a plug in which a wire or electrical contact is embedded, or a metal blade comprising one or more fingers bent towards the brake disc or drum, and the plug or blade is generally associated with the backing plate of the lining in the case of a disc brake or with the flange of the shoe in the case of a drum brake. Alternatively, particularly in disc brakes, the plug or metal blade constituting the moving part of the detecting device has been mounted on an accessory belonging to the friction members, in particular on a noise-reducing spring attached to these members.

Although the known detecting devices are of relatively simple design, their mounting on the friction members of the brake or on their accessories poses certain problems.

Firstly, when the detecting device is attached directly to the friction member the latter lust be specially shaped, as regards both the backing plate or metal flange and the lining pad attached to it. This increases the cost of the friction member, which is of course undesirable since these must be replaced relatively frequently, especially in the case of disc brakes.

Moreover, when the detecting device is not replaced at the same time as the friction members, an operator may omit to put back this device or may put it on incorrectly, so that the device may accidentally escape or, more simply, give a wrong indication.

Another problem is that, irrespective of the type of detecting device, the information given by the latter may be incorrect due to the fact that only one friction member is measured for wear, whereas friction members may wear completely asymmetrically.

Lastly, it has been found that corrosion and dirt often hinder the operation of the detecting device and that suitable protections have to be provided which, of course, lead to rather complicated and expensive devices.

To overcome these disadvantages, the invention proposes to associate the detecting device with the automatic adjusting means so as to have it operated by the latter and also to associate the detecting device with the rotary member to be braked. It is therefore possible to use friction members of any type and to obtain an indication which is a function of the wear on the friction members as a single unit. Also, a single operation suffices to reset the adjusting means and the detecting device to the position which they normally occupy when idle when the linings of the friction members are new. Furthermore, if rust or dirt happen to penetrate the brake, it will be automatically swept so that the device will give an accurate information in all circumstances.

A particular embodiment of the invention will now be described with reference to the accompanying drawings, in which:

FIG. 2 represents a section along a line 2—2 of FIG. 1;

FIG. 3 represents a section along a line 3—3 in FIG. 4; and

FIG. 4 is a fragmentary elevation showing part of the adjusting means and the detecting device for the brake shown in FIG. 1, in the position which they occupy when the friction linings of the shoes are worn.

Figure 1:
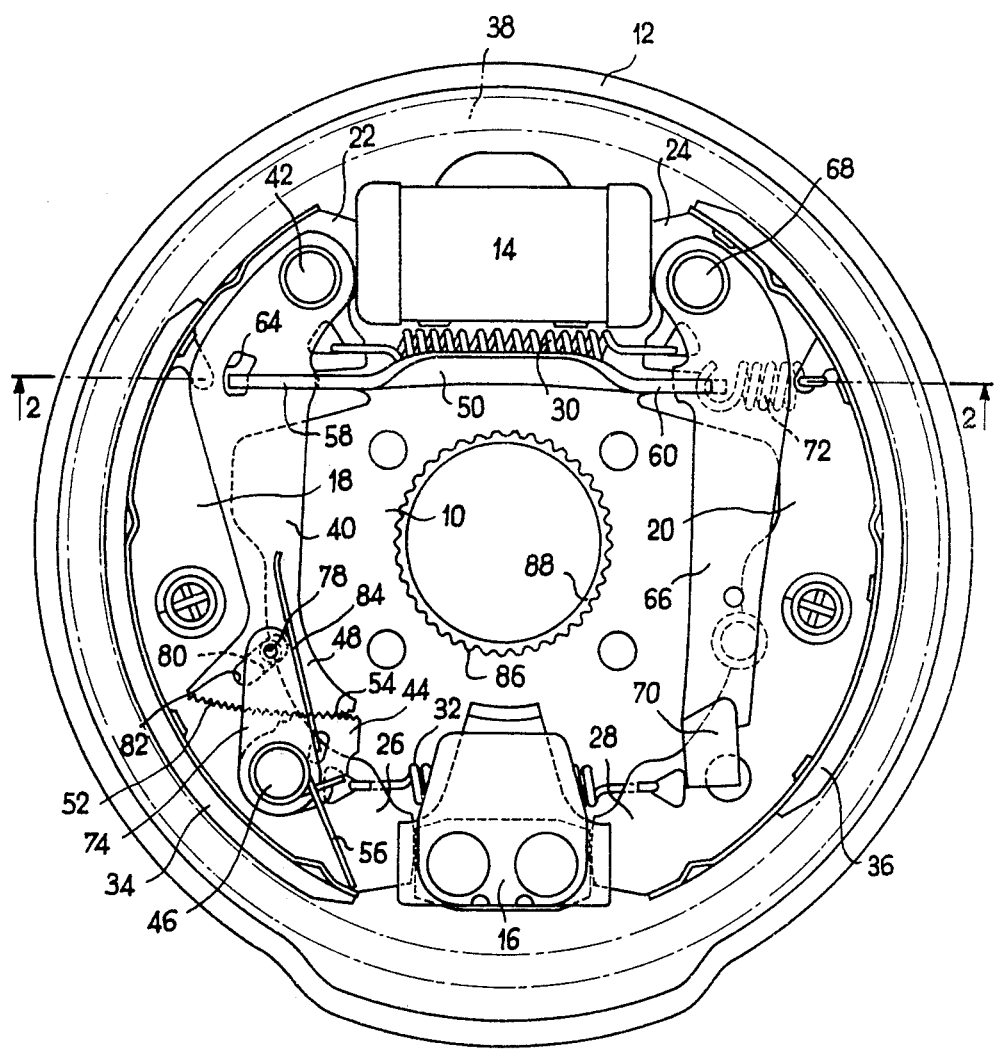
FIG. 1 is a general view of a drum brake embodying the principles of the invention.

The drum brake illustrated in FIG. 1 comprises a support plate 10 designed to be attached to a non-rotating part in the vicinity of a wheel of a vehicle and defining at its outer periphery a substantially circular rim 12. Operating means, for example a wheel cylinder 14, and a fixed fulcrum block 16 are mounted at two diametrically opposite places on the support plate 10. The wheel cylinder 14 can be connected to a pressure fluid source, for example the master cylinder of the vehicle (not shown). Two arcuate brake shoes 18,20 slidably received on the support plate 10 are arranged so that the wheel cylinder 14 can engage two adjacent ends 22,24 of the shoes 18,20 respectively, and so that the two opposite ends 26,28 of the shoes can rest on the fulcrum block 16. Also, two helical springs 30,32 respectively urge the ends 22,24 of the shoes on to the wheel cylinder 14 and the ends 26,28 of the shoes on to the fulcrum block 16. Each shoe 18,20 has a web substantially parallel to the plane defined by the support plate 10 and an arcuate flange on which a respective friction lining 34 or 36 is mounted. The friction linings 34,36 are mounted on the shoe flanges by any known means, for example adhesive or rivets. A drum 38 (chain lines in FIG. 1) associated with a component rotating with the wheel of the vehicle is situated between the circular rim 12 of the support plate 10 and the friction linings 34,36 of the shoes 18,20. Consequently operation of the wheel cylinder 14 tending to separate the ends 22,24 of the shoes urges the friction linings 34,36 into engagement with the rotary drum 38, thus operating the brake.

The drum brake shown in FIG. 1 also comprises adjusting means for automatically increasing the distance between the shoe ends 22,24 as a function of the wear on the linings 34,36 of the shoes. These adjusting means comprise an adjusting lever 40 pivoted, for example by means of a pivot-forming rivet 42, on the end 22 of the shoe 18, a pawl 44 pivoted, for example by means of a pivot-forming rivet 46, on the shoe 18 near the free end 48 of the lever 40 and an operating member 50 responsive to the distance separating the shoe ends 22,24 so as to effect pivoting of the lever 40 on the rivet 42. The adjusting lever 40 has on its free end 48 a toothed sector 52. A toothed sector 54 on the pawl 44 is urged into engagement with the sector 52 by a torsion spring 56. This spring 56 is mounted on the rivet 46 and cooperates by one of its ends with the flange of the shoe 18 and by its other end with the pawl 44, so that it urges the toothed sector 54 into engagement with the toothed sector 52. As best shown in FIG. 2, the operating member 50 comprises a link of which the forked ends 58,60 receive the webs of the shoes 18,20 respectively. The end 58 of the link 50 also receives the adjusting lever 40, with which it cooperates by means of a lug 62 which enters a recess 64 in the lever 40. The resulting cooperation between the link 50 and adjusting lever 40 preferably includes a predetermined operating clearance, below which the link 50 can move freely relative to the lever, and above which any motion of the link 50 to the right in FIGS. 1 and 2 causes the lever 40 to pivot anticlockwise in FIG. 1. Preferably, the end 58 of the link 50 cooperates with the lever 40 near the rivet 42, and the free end 48 of the lever 40 extends near the end 26 of the shoe 18, so that any motion of the end 58 of the link 50 causing pivoting of the lever 40 is amplified substantially at the free end 48 of the latter, so increasing the accuracy of the adjustment. In the embodiment illustrated, the forked end 60 of the link 50 receives, in addition to the web of the shoe 20, a handbrake operating lever 66 which is pivoted, for example, by means of a pivot-forming rivet 68 on the end 24 of the shoe 20, and of which the free end 70 is designed to receive an operating cable (not shown) connectable to a manual operating lever situated in the driver's compartment of the vehicle. Also, a helical spring 72 is inserted between the end 60 of the link 50 and the web of the shoe 20, so that the link 50 normally moves with the shoe 20 but can move relative to the shoe 20 under certain conditions (described below).

Also, abutment means are provided to prevent pivoting of the lever 40 through more than a predetermined angle relative to the position which it occupies when idle while the linings 34,36 are new. These abutment means comprise a rigid member 74 associated with the shoe 18 by means of the rivet 46 bearing the pawl 44. As best shown in FIGS. 1 and 3, the member 74 comprises a sheet of rigid material, for example sheet metal, defining a plane substantially perpendicular to the drum axis. The member 74 is in the form of a link of which one end contains a circular hole 76 receiving the rivet 46 by which the member 74 is pivoted on the shoe 18. The other end of the member 74 bears a stud 78 which extends parallel to the drum axis in an oblong hole 80 formed in the end 48 of the lever 40. The stud 78 is substantially cylindrical, and its length is slightly smaller than the thickness of the lever 40, so that it does not engage the web of the shoe 18. The oblong hole 80 is substantially straight and defines an axis inclined at approximately 45° to a tangent to a circle defined by movement of any point on the axis during pivoting of the lever 40. The stud 78 thus defines an abutment portion of the member 74 capable of engaging the left-hand end 82 of the hole 80 in FIG. 1 when, due to wear on the friction linings 34,36, the link 50 has caused the lever 40 to pivot through an angle such that the stud 78 can engage the end of the oblong hole 80.

Lastly, a device is provided for detecting wear on the linings 34,36 beyond a predetermined value. In accordance with the invention, this detecting device is associated with the self-adjusting means, more particularly with the member 74, and is operated by the motion of the latter.

In the embodiment illustrated, the detecting device is of the vibrating blade type. It consists primarily of a blade 84, formed for example by a part of the member 74 bent at substantially 90° to the latter, so that it is substantially parallel to the axis of the drum 38, and by the outside surface 86 of a hub 88 with which the drum 38 is associated. As best shown in FIGS. 3 and 4, the blade 84 projects beyond the end of the member 74 bearing the stud 78 to a distance such that it engages the surface 86 defined on the hub 88 when the wear on the linings 34,36 has caused the adjusting lever 40 to pivot enough for the stud 78 to come near the end 82 of the hole 80. The surface 86 is substantially cylindrical and bears, for example, irregularities which impart to it a rough or uneven character. The configuration of these irregularities and the dimensions of the vibrating blade define the intensity and frequency of the sound signal generated when the blade 84 makes contact with the surface 86 and are selected so that this signal can be heard by the driver of the vehicle.

The drum brake just described with reference to FIGS. 1 to 4 operates as follows:

On operation of the wheel cylinder 14, the ends 22,24 of the shoes 18,20 are moved apart so that the friction linings 34,36 are brought into frictional engagement with the rotary drum 38, leading to operation of the brake. During this operation, the shoe ends 26,28 remain in contact with the fulcrum block 16 under the influence of the return spring 32. When the shoe ends 22,24 move apart, the link 50 moves with the end 24 of the shoe 20 under the influence of the spring 72, so that the lug 62 on the end 58 of the link moves relative to the recess 64 in the adjusting lever 40. When the movement is less than or equal to the operating clearance existing between the link 50 and lever 40, it does not produce any relative motion of the latter and the shoe 18. When, however, the movement of the lug on the link 50 relative to the recess 64 is greater than this predetermined clearance, the lug 62 engages the right-hand edge of the recess 64 in FIGS. 1 and 2 and so pivots the lever 40 anticlockwise on the rivet 42. The end 48 of the lever 40 therefore moves relative to the pawl 44, tending to pivot the latter clockwise on the rivet 46, counteracting the spring 56. When the end 48 of the lever 40 moves enough for the toothed sector 54 on the pawl 44 to jump over a tooth in the toothed sector 52 on the lever 40, this operation takes place naturally under the influence of the spring 56. Consequently the end 48 of the lever 40 moves to the right in FIGS. 1 and 2 relative to the shoe 18 by an amount corresponding to the distance separating two teeth in the toothed sector 52. When operation of the wheel cylinder 14 ceases, the return spring 30 urges the shoe ends 22,24 towards their idle positions, which may or may not differ from the idle positions occupied by them before operation of the wheel cylinder, depending on whether or not the pawl 44 has jumped over a tooth in the toothed sector 52.

A cycle of this kind is repeated whenever the wheel cylinder 14 operates, so that as the wear on the linings 34,36 increases the free end 48 of the lever 40 moves to the right in FIG. 1, so modifying the distance separating the shoe ends 22,24 in the idle position.

Just as the end 48 of the lever 40 moves progressively relative to the pawl 44, so the stud 78 cooperating with the edge of the oblong hole 80 is urged to the right in FIG. 1, so that the member 74 and vibrating blade 84 turn clockwise on the rivet 46. When the stud 78 reaches the vicinity of the left-hand end 82 of the hole 80, the free end of the vibrating blade 74 engages the surface 86 on the hub 88, so that an audible signal is generated due to the irregularities on this surface and due to the consequent vibration of the blade 74 as soon as the vehicle moves and turns the hub 88. Also, when the stud 78 engages the end 82 of the hole 80, it becomes impossible for the lever 40 to continue pivoting anticlockwise.

Such a situation, determined by the dimensions and relative arrangements of the member 74, lever 40 and oblong hole 80, must arise when the linings 34, 36 are almost completely worn down and before the toothed sector 52 on the lever 40 has pivoted so far relative to the pawl 44 as to escape circumferentially from the latter or engage the wheel hub (not shown).

When the wheel cylinder 14 is operated after the stud 78 has engaged the end 82 of the oblong hole 80, the force transmitted by the link 50 to the lever 40 in order to pivot the latter on the rivet 42 is absorbed by the spring 72, so that none of the components of the brake is damaged.

Note also that the member 60 is so arranged relative to the pawl 44 and lever 40 that it cooperates with those faces of the pawl and lever remote from the shoe 18, irrespective of the position occupied by the lever 40 relative to the shoe 18. It is therefore impossible for the end 48 of the lever 40 to be offset parallel to the drum axis relative to the pawl 44. The member 74 therefore fulfils three roles: it locks the adjusting lever 40 at the end of its travel, to prevent the latter from escaping circumferentially relative to the pawl 44; it prevents the toothed sector 42 from escaping axially relative to the toothed sector 54; and it acts as a wear detector by virtue of carrying the flexible blade 84.

In the event of mechanical operation of the brake owing to the handbrake lever 66 being turned clockwise on the rivet 68, the lever 66 urges the end 22 of the shoe 18 away from the end 24 of the shoe 20 by way of the link 50. The friction linings 34, 36 therefore engage the drum 38, causing mechanical operation of the brake. During this operation, and in contrast to brake operation by means of the wheel cylinder 14, the link 50 moves with the shoe 18, so that the adjusting means comprising the lever 40 and pawl 44 are not operated. The link 50 does, however, move relative to the shoe 20, against the force exerted by the spring 72. When operation of the handbrake lever 66 ceases, the various components of the brake are urged back into their idle positions by the return springs 30, 72.

When the brake shoes are equipped with new linings again, only one operation is required to reset the adjusting means and the detecting device to their operative positions. In the embodiment illustrated, this operation is carried out by tilting the pawl 44 away from the toothed sector 52 on the lever 40, counteracting the spring 56.

It will be appreciated that the invention is not restricted to the embodiment described. In particular, it is possible to associate a wear detector of the vibrating blade or electrical contact type with most self-adjusting means currently used for drum or disc brakes, and to have the detector operated by these adjusting means. For example, most mechanically operated disc brakes are equipped with self-adjusting means having at least one moving part with which it is possible to associate an electrical contact capable of engaging the disc so as to close an electrical circuit comprising an audible or visual warning device. Similarly, a drum brake equipped with adjusting means such as, for example, those described with reference to FIGS. 1 to 4 may have instead of the blade 84 and surface 86 an electrical contact attached to the member 74 and capable of engaging a smooth surface of the hub which acts as a contact in order to close an electrical warning circuit. In the case of an electrical warning device, it will be noted that dirt or corrosion has no substantial effect on the operation of the device since all undesirable particles, which might appear either on the electrical contact or on the disc or the hub, will be automatically swept so that the device will give an accurate information in all circumstances.

What we claim is:

1. A friction brake comprising operating means capable of urging at least one friction lining pad into braking contact with a rotary member in order to slow down the rotation of the latter, adjusting means being provided to modify automatically the position occupied by the friction lining pad in the absence of operation of the operating means according to the wear on the pad, said adjusting means comprising at least one movable member responsive to wear of the friction lining pad so as to move relative to the rotary member, and a device being provided to detect wear on the friction lining pad, said detecting device being operated by the movement of the movable member relative to the rotary member and comprising at least two portions normally spaced from one another when the wear on the friction lining pad is less than a predetermined value, the establishment of contact between the said portions giving rise to a warning signal, one of the said portions being associated with the movable member, the other being associated with the rotary member, the portion of the detecting device associated with the movable member comprising at least one flexible blade capable of engaging a rough cylindrical surface defined on the rotary member and constituting the other portion of the detecting device, in order to generate an audible signal when the wear on the friction lining pad is greater than a predetermined value, the rotary member comprising a drum mounted on a central hub, the friction lining pad being associated with a brake shoe, the rough cylindrical surface being defined by the outside surface of the central hub.

2. A friction brake according to claim 1, comprising two brake shoes, the operating means being situated between two adjacent ends of the shoes, and the adjusting means modifying the distance separating the said ends in the absence of operation of the operating means according to the wear on the friction lining pads of the shoes, the adjusting means comprising a lever and a pawl, both pivotable on one of the shoes and cooperating by way of a toothed sector, and an operating member responsive to the distance between the said ends of the shoes in order to pivot the lever in the direction corresponding to brake adjustment, the flexible blade being responsive to pivoting of the lever.

3. A friction brake according to claim 2, wherein the flexible blade is associated with a member pivoted at one of its ends on a pin bearing the pawl, the other end of the said member cooperating with the free end of the lever in order to pivot about the pin in response to pivoting of the lever.

4. A friction brake according to claim 3, wherein the flexible blade defines a plane substantially parallel to the drum axis and extends beyond the other end of the member.

5. A friction brake according to either claim 3 or 4, said member comprising a stud which enters an oblong hole in the lever, one end of the hole defining an abutment surface which is engaged by the stud when the wear of the friction lining pads is greater than the predetermined value, in order to prevent pivoting of the lever beyond this value.

* * * * *